(12) United States Patent
Bachwani et al.

(10) Patent No.: US 9,753,863 B2
(45) Date of Patent: Sep. 5, 2017

(54) MEMORY PROTECTION WITH NON-READABLE PAGES

(71) Applicant: Intel Corporation, Santa Clara, CA (US)

(72) Inventors: Rekha N. Bachwani, Portland, OR (US); Ravi L. Sahita, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 11 days.

(21) Appl. No.: 14/583,681

(22) Filed: Dec. 27, 2014

(65) Prior Publication Data

US 2016/0188492 A1 Jun. 30, 2016

(51) Int. Cl.
  *G06F 12/10* (2016.01)
  *G06F 12/14* (2006.01)

(52) U.S. Cl.
  CPC .............. *G06F 12/14* (2013.01); *G06F 12/10* (2013.01); *G06F 12/1408* (2013.01); *G06F 12/1441* (2013.01); *G06F 2212/1052* (2013.01); *G06F 2212/657* (2013.01)

(58) Field of Classification Search
  CPC .. G06F 12/14; G06F 12/1441; G06F 12/1408; G06F 12/10; G06F 2212/1052; G06F 2212/657
  See application file for complete search history.

(56) References Cited

U.S. PATENT DOCUMENTS

| 5,949,973 A | 9/1999 | Yarom |
| 8,341,369 B2 | 12/2012 | Savagaonkar et al. |

(Continued)

FOREIGN PATENT DOCUMENTS

| WO | WO-2010054369 A1 | 5/2010 |
| WO | 2013095577 | 6/2013 |
| WO | WO-2016105562 A1 | 6/2016 |

OTHER PUBLICATIONS

"McAfee DeepSAFE Technology FAQ," pamphlet, McAfee, Inc., Santa Clara, CA, pp. 1-4 (2011).

(Continued)

*Primary Examiner* — Hiep Nguyen
(74) *Attorney, Agent, or Firm* — Schwegman Lundberg & Woessner, P.A.

(57) ABSTRACT

A method includes, in various implementations, regulating a memory region for execute-only access, storing a set of instructions in the memory region, executing an early instruction among the set of instructions, and executing a set of subsequent instructions among the instructions. The early instruction loads a secret value into a volatile register. A correct execution of the subsequent instructions depends on the secret value being loaded into the volatile register.

A system includes, in various implementations, a memory and a processor with one or more volatile registers. The processor regulates access to portions of the memory. The processor can load a secret value into the volatile register in response to executing a program stored in an execute-only portion of the memory. The processor is configured to lose, in response to an asynchronous event, information loaded in the volatile registers.

30 Claims, 7 Drawing Sheets

(56) References Cited

U.S. PATENT DOCUMENTS

| | | | |
|---|---|---|---|
| 2006/0288235 A1* | 12/2006 | Goto | G06F 12/1491 713/190 |
| 2008/0229425 A1 | 9/2008 | Perrin et al. | |
| 2009/0210644 A1* | 8/2009 | Batifoulier | G06F 12/1441 711/163 |
| 2014/0173293 A1 | 6/2014 | Kaplan | |
| 2014/0283056 A1 | 9/2014 | Bachwani | |
| 2014/0380009 A1* | 12/2014 | Lemay | G06F 12/145 711/163 |
| 2016/0048464 A1* | 2/2016 | Nakajima | G06F 12/1475 711/152 |
| 2016/0188354 A1* | 6/2016 | Goldsmith | G06F 9/45558 718/1 |

OTHER PUBLICATIONS

"White Paper: Root Out Rootkits," pamphlet, McAfee, an Intel Company, Santa Clara, CA, pp. 1-12 (2012).
"Executable space protection," *Wikipedia*, 6 pages (Dec. 19, 2013).
"Indirect branch," *Wikipedia*, 1 page (Mar. 13, 2014).
"Memory protection," *Wikipedia*, 4 pages (May 11, 2014).
"Return-oriented programming," *Wikipedia*, 5 pages (May 19, 2014).
"Call stack," *Wikipedia*, 8 pages (May 21, 2014).
"Content-addressable memory," *Wikipedia*, 4 pages (Jul. 1, 2014).
"International Application Serial No. PCT/US2015/000457, International Search Report dated May 6, 2016", 3 pgs.
"International Application Serial No. PCT/US2015/000457, Written Opinion dated May 6, 2016", 7 pgs.

\* cited by examiner

610 → mov rsp, 0xF4F4F4F4F4F4F4F4

620 → mov rsp, 0x606162F4F4F4F4

630 → mov rsp, 0xF4626160F4F4F4F4

640 → mov rsp, 0x60606060F4F4F4F4

650 → mov rv1, 0x6062F461F4F4F4F4

660 → mov rv2, 0x3aee5514cb65f3fc

FIG. 6

MEMORY PROTECTION WITH NON-READABLE PAGES

FIELD OF THE INVENTION

The present disclosure relates in general to information security and in particular to the use of hardware-regulated access permissions.

BACKGROUND

Modern computing systems employ a variety of techniques to ensure that malicious, spurious, or other invalid programs do not obtain control over a computer processor. Many processors are designed so that hardware and software can cooperate in efforts to prevent invalid code from being executed by the processor. Many processor designs enable hierarchical domains of protection for accessing the processor and/or other resources. For example, only special programs such as operating systems or hypervisors may be permitted to execute on a processor using the processor's highest-privilege mode (e.g., "ring 0" or a "supervisor" mode). Depending on their assigned level of privilege, various programs may or may not have access to protected resources, such as I/O devices, protected memory regions, memory tables, interrupt disablement, direct access to the processor, images of other virtual machines, or other resources.

Various invalid programs may gain access to restricted resources by executing partial sections of otherwise-privileged code that is present on a computing system. Examples include malicious return-oriented programming (ROP) attacks and jump-oriented programming (JOP) attacks, which may attempt partial execution of privileged code (e.g., by initiating execution at a mid-point in the flow of the code). In various situations, Trojan, worm, virus, or other vectors can introduce malware that initiates execution of sections of privileged code that is already present in a computer's memory. By executing a selected section or sections of the privileged code, the malware may be able to accomplish tasks that would otherwise be denied to the malware.

BRIEF DESCRIPTION OF THE DRAWINGS

The benefits, features, and advantages of the present disclosure will become better understood with regard to the following description, and accompanying drawings where:

FIG. 6 shows some examples of entry-point instructions that may be used to load a volatile register with a keystring.

DETAILED DESCRIPTION

Figure 1:
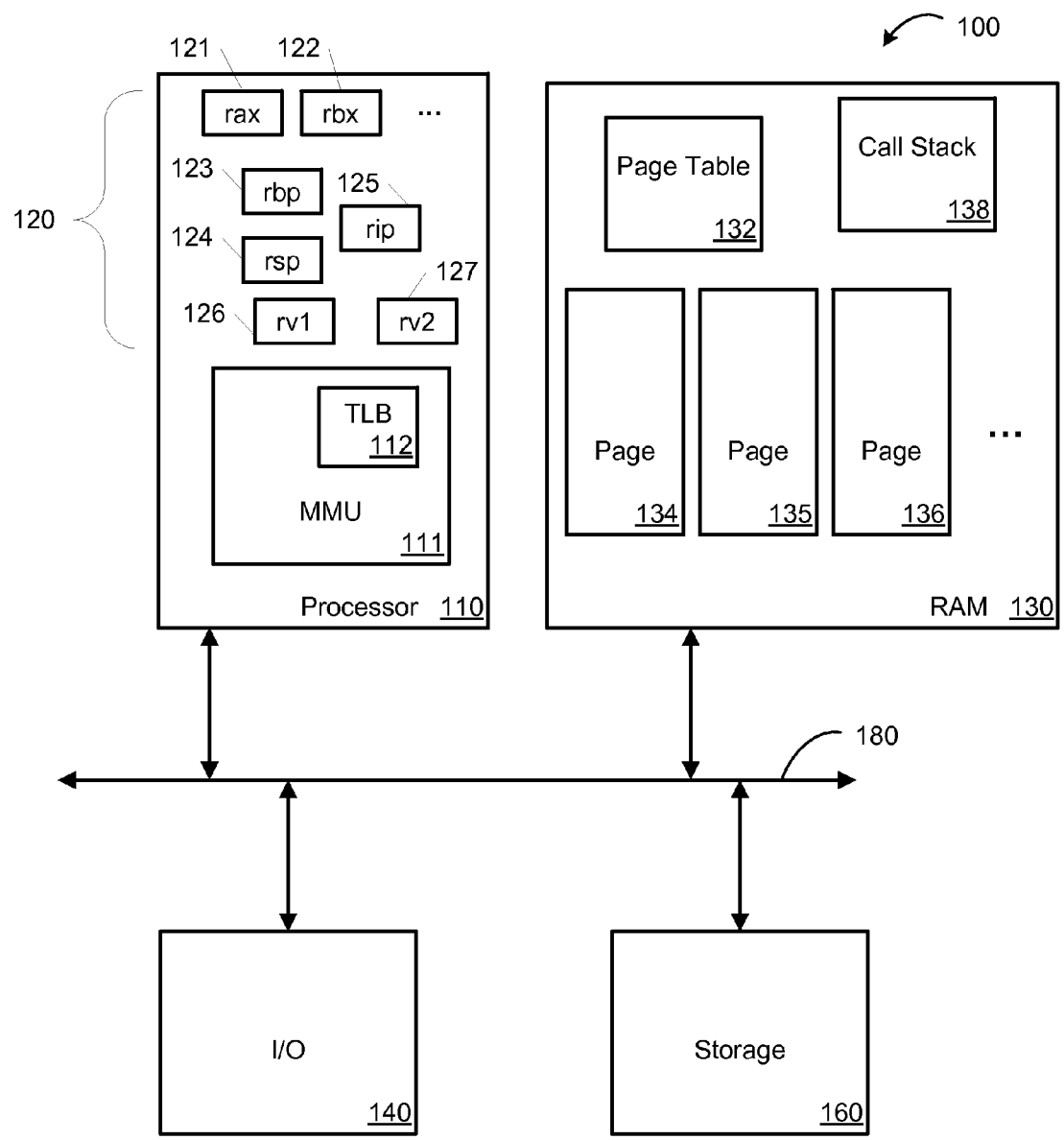
FIG. 1 shows one implementation of a computing system.

FIG. 1 shows one implementation of a computing system 100. System 100 includes a processor 110, a random access memory (RAM) 130, an input/output circuitry (I/O) 140, and a storage device 160. A system bus 180 connects processor 110, RAM 130, I/O 140, and storage device 160 to enable communication among these components and others.

Processor 110 includes circuitry configured to execute computing instructions. Internal to processor 110 are various memory components such as caches, registers, and buffers. In the illustrated example, processor 110 includes registers 120 and a memory management unit (MMU) 111 that includes a translation lookaside buffer (TLB) 112. RAM 130 is used to store executable code and information during operation of system 100. Storage device 160 represents one or more hard drives, optical drives, flash drives, or other memory used for bulk storage or non-volatile storage of data and instructions. I/O 140 is used by system 100 to communicate with other systems or devices. I/O 140 can include wired or wireless network devices or other receivers, transmitters, or transceivers and supporting modulators and baseband circuitry.

Registers 120 are used by processor 110 to hold data that is being used or manipulated by machine language instructions executing on processor 110. In this example, registers 120 include several general registers (including rax 121 and rbx 122), base pointer (rbp) 123, stack pointer (rsp) 124, instruction pointer (rip) 125, and volatile registers (including rv1 126 and rv2 127). The volatile registers are configured in hardware to erase, scramble, or otherwise protect their contents in response to events that could indicate activity by malicious or other invalid code. For example, volatile registers 126 and 127 may be configured so that their contents are erased whenever an interrupt, memory error, protection error, or other fault occurs, or any event occurs that indicates an asynchronous change in control flow.

During operation, a set of pages may be stored in RAM 130, including pages 134, 135, 136. Each page is a block of memory that is assigned for use by one or more processes or other activities executed processor 110. In various implementations, each page consists of memory with a contiguous set of addresses. In the illustrated implementation, the contiguous addresses in each page are portions of a virtual address space. The pages are mapped to frames, which indicate the corresponding hardware addresses or machine addresses (not shown). In other implementations, the contiguous addresses in the memory pages directly indicate the addresses in a memory hardware device. In various systems, a memory page is a basic unit of memory that is allocated by an operating system for use by a program or for transfers between RAM 130 and storage device 160. In various systems, the architecture of processor 110 requires that size of each page is a fixed value, such as 512 Bytes, 4 KB, 2 MB, 1 MB, 16 MB, or other values. In other systems, the pages can be allocated with different sizes.

A page table 132 may also be stored in RAM 130. Page table 132 is an active index of the various pages being maintained in memory. In the illustrated example, page table 132 indicates the extents of each page 134, 135, 136, and also holds mapping information between the virtual address space and the corresponding physical address space where data is actually stored in hardware elements. For example, page table 132 may indicate the appropriate frame number (in physical address space) that corresponds to a page number (in virtual address space). Page table 132 includes a page table entry (PTE) for each of the pages being used by applications and other programs executing on processor 110. To accelerate translations between virtual and physical memory addresses, TLB 112 caches various page table mappings, which may relate directly or indirectly to the entries page table 132.

A call stack 138 may also be stored in RAM 130. Call stack 138 holds information about a process or program being executed by processor 110, including the status of a currently executing sub-routine, and the status of any higher level routines that called the current routine. In particular, call stack 138 holds information about the calling point to which control should return once the current subroutine is completed. The top of call stack 138 is indicated by an address stored in stack pointer 124 (from FIG. 1). The bottom of the current section of call stack 138 is indicated by an address stored in base pointer 123.

Figure 2:
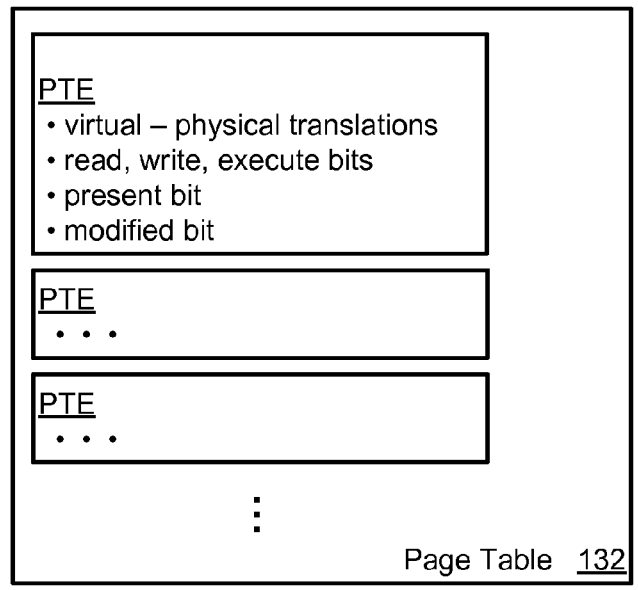
FIG. 2 shows one example of page table.

FIG. 2 shows one example of page table 132. In this example, the page table includes several page tale entries: one for each page that is resident in RAM 130 or that has been offloaded to storage device 160. Each PTE includes mappings that provide translations between virtual addresses (which may be used by processor 110 when communicating with programs) and physical addresses (which may be used by processor 110 when accessing memory hardware through an address bus).

Each PTE also includes indicators of the permissions granted for the corresponding page, such as read, write, and execute permissions. In the illustrated example, these permissions are stored as read, write, and execute bits that grant or deny access.

For example, if a page table indicates that a page is designated for write access, then processor 110 will allow the process(es) or thread(s) that have access to that page to write data into the page or otherwise alter the information in the page. Otherwise, the process (or processes) will be unable to write into the page. Similarly, if the page is designated for read access, then processor 110 will allow the processes that have access to that page to read the information in the page and copy the information to other memory locations. Otherwise, the process will be unable to read the page. Moreover, if the page is designated for execute access, then processor 110 will allow the processes that have access to that page to call or branch to instructions on the page, or otherwise initiate execution of the instructions by processor 110. Otherwise, the process will be unable to execute instructions stored in the page.

Each PTE may also hold information on the status of the corresponding page. For example, a present bit can indicate whether or not the page is currently resident in RAM 130. If the page is not resident when it is needed, MMU 111 initiates a "pagefault" condition, which causes an operating system to load the page into RAM 130 from storage device 160. A modified bit can indicate whether or not the page has been modified in RAM 130 since it was last written to storage device 160.

Figure 3:
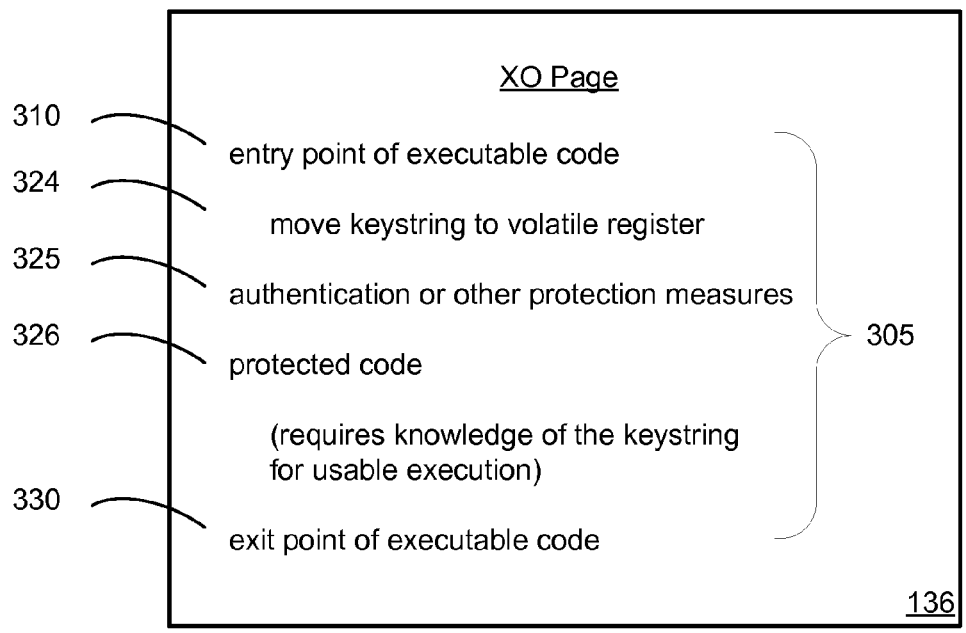
FIG. 3 shows an example of the contents of a page.

FIG. 3 shows an example of the contents of page 136. In this example, page 136 has been set to have execute-only access. Such access can be used, for example, for pages that hold a section of processor-executable instructions. In this example, a set of machine language instructions have been stored in page 136. The instructions form a set of executable code 305 that can be executed by a processor such as processor 110. Code 305 can be, for example, a set of instructions configured to work together in sequence to accomplish a desirable task, such as a portion of a calculation, a read or write to storage device 160 or to another portion of RAM 130, a communication through I/O 140, an access to a peripheral device, or some other operation.

Code 305 may be used by one or more processes to accomplish tasks. The calling process would initiate execution of code 305 through a branching instruction such as a subroutine branch (call/ret), jump (jmp), or conditional jump (je, jne, jz, . . . ). A valid branch into code 305 would update call stack 138 prior to starting execution of code 305. That update may, for example, record certain information about the status of the calling process. The status information recorded into call stack 138 may include the contents of various registers 120, including instruction pointer 125, and various variables in use by the calling process. The contents of stack pointer 124 and base pointer 123 can also be recorded into call stack 138, and then revised to indicate the new frame of the updated stack.

Once the call stack has been updated, execution of code 305 can proceed. A valid call to code 305 will initiate execution of the code at a point that is suitable for proper execution of the code. In the illustrated example, code 305 has only one valid starting point: entry point 310. In this example, code 305 has been designed so that safe and reliable execution relies on execution starting at entry point 310.

One problem that arises in the protection of computer systems is the defense of the systems against malicious or incorrect or spurious programs that initiate execution of code segments (such as code 305) at mid-points that were not intended for entry. For example, malicious code-reuse attacks may be launched against a system. Code-reuse attacks, such as return-oriented programming (ROP) and jump-oriented programming (JOP), have become increasing threats as designers make their systems resistant to code injection. That resistance can thwart an attacker from inserting their own code into a computer system. Thus, some attackers have turned to code-reuse attacks. These attacks attempt to string together portions of valid code that is already present on a computer system, but in ways that were not intended by the designers of that valid code. The snippets of existing valid code are executed by the attack in a way that can be detrimental to the system or to users who rely on the system's security.

Code 305 is an example of code that has been configured to resist a code-reuse attack. Immediately or shortly after execution initiates in entry point 310, code 305 includes an entry-point instruction 324 to move a keystring into volatile register 126. The keystring is a value that is required for successful execution of subsequent portions of block 305. These subsequent instructions are illustrated in FIG. 3 as protected code 326.

Code 305 may include, prior to protected code 326, some defensive instructions 325. Defensive instructions 325 may implement authentication or other protection measures to ensure that protected code is only reached by valid programs. For example, defensive instructions 325 may examine the stack or other portions of memory for appropriate signs or signatures that authenticate the validity of the calling program. If a malicious or otherwise invalid program attempts to run code 305, the defensive instructions may detect the invalid operation and return or otherwise end program control so that execution does not proceed to protected code 326. If, however, defensive instructions 325 validate the current execution, then control proceeds to protected code 326, which performs some useful function (memory access, read or write to a memory or device, or a calculation, or an encryption or signature operation, for example, among other functions).

An invalid calling program may attempt to enter code 305 at a point subsequent to the protection measures 325. To help thwart the progress of such an invalid program, protected code 326 may itself be designed with protective features.

In this example, protected code 326 is configured to depend on the keystring, which is held as a secret value in volatile register 126. In particular, the protected code is structured so that it cannot be properly executed without knowledge of the keystring. For example, the keystring may be a cryptographic key that is needed for unlocking or locking or authenticating data that is accessed by protected code 326.

Alternatively, the keystring that is held as a secret in volatile register 126 may be a target address, or may be decoded or otherwise used for determining a target address. The protected code can use the target address for a jump or call for further execution, or to retrieve some sensitive data that is available at that address. The target address may be an address that is outside of protected code 326, or it may be an address within protected code 326.

In some implementations where the target address is an address outside of protected code 326, the keystring may be understood as a "wormhole" that provides access to the target address. Without the keystring, an adversary would have to guess at the target address to successfully reach it and the executable code or information that is available there. With the use of current addressing schemes (e.g., physical or virtual addresses that may have 64-bit or 128-bit address sizes), it may be intractable for an adversary to guess the target address among the large universe of possible addresses. Thus, the sensitive information or code is only accessible to a party who uses the "wormhole" keystring. In addition, a hypervisor may be configured to detect and shut down a program that performs suspicious behavior such as searching apparently randomly through memory space for the correct target address.

In some implementations where the target address is an address to an instruction within protected code 326, the keystring may be understood as a tool for unraveling a "scrambled" or "randomized" format in which protected code 326 has been written. In some implementations, protected code 326 may be scrambled by a hypervisor or other supervisory program when it is initially stored on an execute-only page. At that time, the supervisory program may record the needed unscrambling information into the keystring in entry-point instruction 324.

Alternatively, the keystring may be a page table address or a VMFUNC view index (which may be loaded as a secret value in an ECX register) for an extended page table. Subsequent instruction (e.g., a MOVE CR3 instruction or a VMFUNC instruction) may decode the page table or extended page table and use the information to change memory mappings or permissions.

Because of its dependence on the keystring that is held in volatile register 126, protected code 326 relies on the move instruction 324 that appears earlier in block 305. As a result, block 305 forms a transactional unit. In this example, the instructions in protected code 326 need to be executed after instruction 324 in order to produce a usable or sensible result. If a malicious or other invalid action were to jump to an instruction somewhere in the midst of protected code 326, the outcome would not be usable; indeed, the forward progress of the code might not be possible. Without knowledge of the keystring, the partial execution of protected code 326 would fail. In this sense, block 305 is an atomic section of code: unless this block is executed as a whole it is not practically usable.

After protected code 326 has been executed, code 305 concludes at an exit point 330. Exit point 330 may be, for example, a return instruction that causes a calling routine to resume execution, or a jump instruction that initiates execution of another block of code. Exit point 330 may include, for example, a subroutine branch (call/ret), jump (jmp), or conditional jump (je, jne, jz, . . . ). As part of the exit operation, call stack 138 is unstacked in a suitable manner to pass or return control to the other code. In a return operation, the old contents of stack pointer 124 and base pointer 123 can be removed from call stack 138 and loaded back into stack pointer 124 and base pointer 123.

One example of an outline of instructions that may be used in code 305 is shown below.

```
//code on EPT Execute-only page
CLI
<save register state and other context>
MOV EDX, keystring // [NEW] load hypervisor patched value --- start
                    transaction
MOV EAX, leaf (example 0 for view switch) //load vmfunc operation
//load vmfunc specific operands
MOV ECX, view-id
VMFUNC //CPU clears EDX if VMFUNC succeeds -- end transaction
CMP EAX, leaf //validate Vmfunc operation requested was expected
JNZ Error
CMP ECX, view-id //to enforce view switch direction
JNZ Error
CALL 0
POP EAX
CMP EAX, expected_gva
JNZ Error
MOV CR3, asserted CR3 //switch to asserted page table for view
<other context switch>
<restore register state>
IRET //restore interruptability and continue to desired entry point
```

Figure 4:
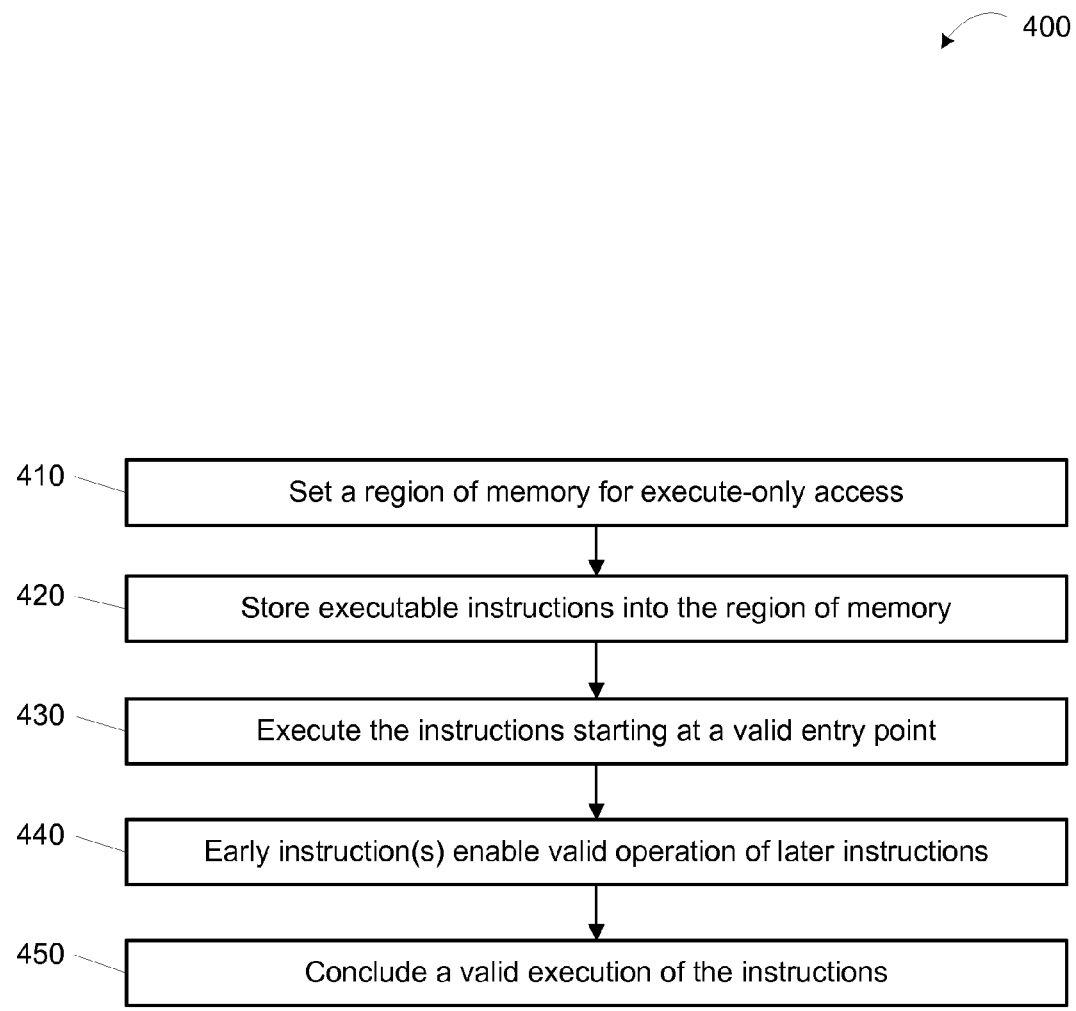
FIG. 4 shows an example of a valid operation in which protected code is prepared and successfully executed.

FIG. 4 shows an example of a valid operation 400 in which protected code is prepared and successfully executed. FIG. 4 shows a general illustration; the page of code from FIG. 3 is an example of code that could be used in operation 400. In act 410, a memory page or other region of memory is designated for execute-only access (for example, memory page 136 from FIGS. 1 and 3). This designation can be performed, for example, by an operating system or other supervisory program that causes a processor to set the appropriate bits in a permission table. For example, the read, write, and execute bits in a corresponding extended page table may be set to {0 0 1}—or other settings that enable execution while denying read or write access to the memory region.

In act 420, an operating system or supervisory program causes a processor to write a set of instructions that include protected code (e.g., code 305 from FIG. 3) into the memory region. Immediately thereafter, or at some subsequent time, a processor may start execution of the set of instructions in act 430. This start is at a valid entry point in the set of instructions (e.g., entry point 310). In act 440 an initial instruction or other early instruction in the set of instructions causes the processor to perform an action that is needed to enable proper operation of later instructions in the set (e.g., protected code 326 in FIG. 3). For example, a volatile register can be loaded with a key on which later instructions depend (e.g., entry-point instruction 324). In act 450, the remaining instructions in the set of instructions continue and conclude with proper execution on the processor. (In the example of FIG. 3, the remaining instructions use the key stored in the volatile register to properly perform an intended activity.)

Figure 5:
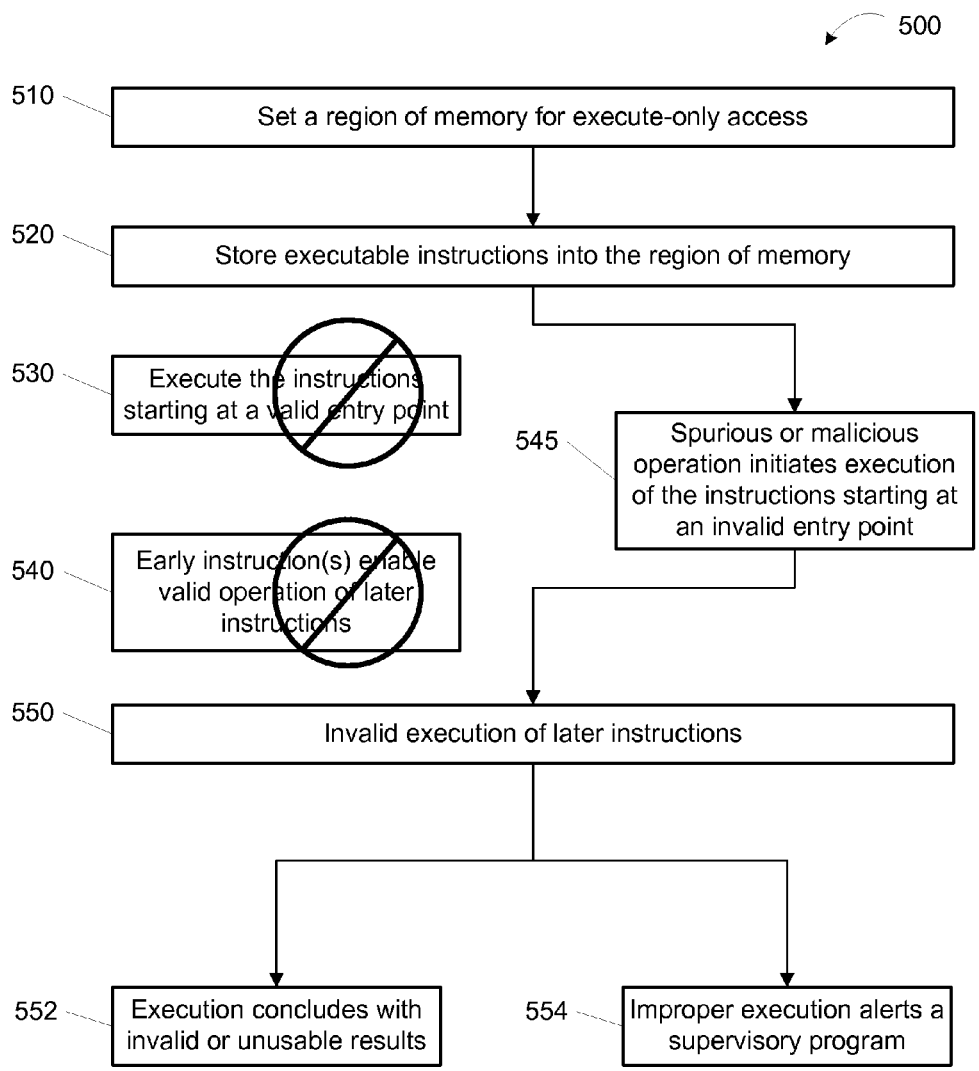
FIG. 5 shows an example of an invalid operation in which protected code is prepared and then subjected to an improper access.

FIG. 5 shows an example of an invalid operation 500 in which protected code is prepared and then subjected to an improper access. For example, an adversary may attempt to benefit by using only a portion of the protected code. In some situations, it can be helpful to hide the protected code by storing it in a page that is non-readable (e.g., execute-only) by other programs. Nonetheless, an adversary may attempt to deduce the contents or function of the protected code by somehow jumping to or otherwise executing the protected code. In the example of FIG. 5, such inappropriate explorations may be thwarted by the use of later instructions that depend on the prior execution of earlier instructions.

In act 510, a memory page or other region of memory is designated for execute-only access. In act 520, a set of instructions that include the protected code is written into the memory region. So far, these acts (510, 520) correspond to the acts discussed above (410, 420) during a valid operation in the previous example of FIG. 4. In this example, however, some error or attack occurs, and a processor does not execute the set of instructions at a valid starting point 530. Instead, in act 545 a malicious or other invalid process causes the processor to initiate execution of the protected code at an invalid entry point—at a point subsequent to the valid entry point. This invalid entry may be helpful to the adversary because, for example, the later entry may bypass some initial protection measures that occur in an initial block of instructions right after the entry point (e.g., authentication or memory protections such as defensive instructions 325 in FIG. 3). By bypassing these initial protection measures, an adversary may hope to use the valuable part of the protected code, without being thwarted by the protection measures in the initial block. Such approaches may be used, for example, by an adversary in designing or executing ROP or JOP attacks.

Because of this invalid entry into the protected code, the execution of invalid operation 500 skips the initial portion of the protected code: the early instruction(s), which enable valid operation of later instructions, are not executed 540.

For example, as discussed above, one or more early instructions (e.g., instruction 324 in FIG. 3) in the protected code may be configured to load a key in a volatile register, and the later instructions (e.g., instructions 326 in FIG. 3) may be configured to rely on the bytes stored in that volatile register. Without the benefit of execution of the early instructions, the later instructions do not have access to the enabling features that would have been provided by execution of the early instructions 540.

The later instructions then fail when they are executed in act 550. The failure occurs because the later instructions cannot operate in a valid manner. For example, if the enabling instructions 540 were configured to provide a cryptographic key into a volatile register, then the later instructions may be unable to decrypt or authenticate or sign data that is to be read or written. Instead, the later instructions would attempt to use whatever residual information happens to be present in the volatile register as a key. This attempt would lead to a nonsensical or incorrect decryption, or a failed authentication, or a detectably invalid signature.

Similarly, if the missing feature was an address that should have been loaded into a volatile register, then the later instructions may be unable to jump to an appropriate instruction at that address, or may be unable to read data from that address. Instead, the later instructions may access an incorrect address, based on whatever residual information happens to be present in the volatile register. Similarly, if the missing feature was a page table address or a view index for an extended page table, then the later instructions may be unable to change memory mappings or permissions in a usable manner.

Because of the failed execution in act 550, operation 500 may complete execution of the later instructions (e.g., instructions 326 in FIG. 3) using spurious residual information instead of an appropriate key. The result would be invalid or unusable results, as indicated in act 552. Alternatively, the improper execution in act 550 may trigger a fault or an interrupt or otherwise alert a supervisory program, which may halt the execution of invalid operation 500 in act 554. Either of these outcomes (552 or 554), or other failure outcomes, are successful denials of a malicious or otherwise invalid attempt to use the protected code. These denials may prevent a ROP or JOP from being able to execute (or examine) the protected code.

Various code-protection schemes rely on elaborate paging structures to restrict access to protected code. These schemes can introduce substantial overhead, e.g., by spending clock cycles switching pages during faults, interrupts, and other exits that pass control to a hypervisor for access authentication. This switching can introduce large overhead, e.g., by requiring the flushing of a translation lookaside buffer (e.g., TLB 112) and proceeding with a cold hardware cache. In various implementations, the use of an entry point instructions (e.g., entry point 310 and/or instruction 324) along with code that fundamentally depends on prior execution of the entry point instruction can help to protect the code, without extensive switching among pages and without the associated overhead. For example, both the successful conclusion in act 450 of a valid operation and the thwarting conclusion 552 of invalid operation 500 are reached by in-line execution of protected code, without the need for page switching that may accompany an interrupt or other intervention by a hypervisor or other supervisory program.

FIG. 6 shows some examples of entry-point instructions that may be used to load a volatile register with a keystring. One example of an entry-point instruction is Intel 64 assembly instruction 610:

mov rsp, 0xF4F4F4F4F4F4F4F4

In this example, the stack pointer (e.g., stack pointer 124) is used as a volatile register. In assembly language, instruction 610 may be presented as "48BCF4F4F4F4F4F4F4F4" (in raw hexadecimal) or "\x48\xBC\xF4\xF4\xF4\xF4\xF4\xF4\xF4\xF4" (in a string constant) or "{0x48, 0xBC, 0xF4, 0xF4, 0xF4, 0xF4, 0xF4, 0xF4, 0xF4, 0xF4}" (in an array constant).

One example of a disassembly presentation of instruction 610 is:

```
0:  48 bc F4 F4 F4 F4 F4   movabs rsp, 0xF4F4F4F4F4F4F4F4
7:  F4 F4 F4
```

Instruction 610 may be used, for example, as an entry-point instruction (e.g., instruction 324 in FIG. 3) to be placed on a memory page that has execute-only access. For example, instruction 610 may be placed on a memory page that is executable only in supervisory mode (and which does not have read or write access). In this example, "F4F4F4F4F4F4F4F4" is an immediate quad-word (64 bit) value. Instruction 610 causes this immediate value to be moved into the stack pointer.

If this keystring value were to be read as an address, then it would be a non-canonical address (since it starts with 0xF4). This aspect provides some attack resistance against a malicious or otherwise invalid software may attempt to deduce the immediate value. In various implementations, a system may be configured so that using a non-canonical address (e.g., when performing a read or write) causes a general protection fault (#GP) or double-fault (e.g., when executed in 64-bit supervisory mode). Such conditions can return execution control to a hypervisor, such as a root mode of virtual machine extensions (VMX-root). For example, a Virtual Machine Control Structure (VMCS) may be configured to cause a virtual machine exit (VM Exit) on such faults. Such responses can help avoid revealing the keystring or other secret value to the invalid software.

Similarly, if this value were to be read as an instruction then it would also provide some attack resistance because the F4 hex values decode to 1-byte HLT (halt) opcodes. The HLT opcodes would invoke a hypervisor or other supervisory program if executed. In this example, the full string (the eight F4 values) is an immediate value for the MOV instruction: this string is itself included in the instruction. This value is loaded into the stack pointer by the MOV instruction. The HEX value F4F4F4F4F4F4F4F4 serves as a keystring or secret value that is then available to subsequent instructions. The subsequent instructions in the protected code may read the keystring from the stack pointer. When executed from memory that can only be executed with supervisory privileges, using non-canonical values for the stack pointer register in 64-bit mode may help assure that the VMX-root (hypervisor) will be invoked if the code is subsequently interrupted. Returning control to the hypervisor in this manner can help avoid revealing the secret stack pointer value to an improper operating system or other improper software.

In various implementations, a hypervisor can be configured to ensure that the entry-point instruction, with its secret keystring, is placed within an executable-only (not read, not write) page. This configuration adds security because various software would be forbidden to read information from an executable-only memory page. Thus, a malicious or otherwise invalid software may be unable to read the keystring from the executable-only memory page. In addition to execute-only memory, various implementations of processors allow a hypervisor to designate a page of memory as executable-only in supervisory mode, using permissions in extended page tables. Thus, the code on such a page can be executed only if it is running with high (supervisor) privilege, and cannot be executed from userspace.

Moreover, the stack pointer is volatile in the sense that its contents are rewritten in the event of an asynchronous change to the control flow. Thus, if a malicious program were to somehow interrupt the flow of the protected code in an attempt to execute code that would read the stack pointer, the information in the stack pointer would be destroyed before the malicious program could execute an instruction to perform the reading attempt.

The appropriate later instructions—which occur later in a code sequence than the entry-point instruction—can be configured so that, under proper execution, their proper execution relies on the keystring stored in the stack pointer. Valid software programs, which would start execution of code on the executable-only page at the entry-point instruction, would initially load the keystring into the stack pointer and would then be able to access the keystring from the stack pointer when needed during the later instructions.

It is noted that instruction 610 diverts the stack pointer from its normal utility: after instruction 610 has been executed, the stack pointer no longer indicates the correct top of the stack. Thus, the code that follows instruction 610 may be tailored so that it does not require use of the stack, or at least, so that it does not require knowledge of the top of the stack.

Instruction 610 may be helpful to protect the subsequent instructions in the code sequence. These later instructions (e.g., protected code 326 in FIG. 3) may be configured so that the keystring is needed in order to do anything useful. For example, the keystring may be an address that the later instructions can decode and then jump (JMP) to, or a memory address that the later instructions can decode and then use to access load/store memory (e.g. via another MOV instruction), or a page table address for an extended page table that later instructions will decode and use to change memory mappings and permissions via either the MOV CR3 instruction, or a view index for an extended page table that later instructions will decode and use to change memory mappings and permissions via the VMFUNC instruction, or a key that the later instructions can use to encrypt, decrypt, or cryptographically verify the integrity of contents of memory generally.

If an improper software program were to attempt to start execution of code on the executable-only page at a later instruction, then it would do so without having access to the keystring that is made available by the entry-point instruction. Other measures may also be used instead, or in addition, to protect the keystring from being accessed by malicious code.

Unable to read the keystring from the execute-only memory page, and having not executed the entry-point instruction, the improper software program would lack the secret keystring. As a result, the improper software program would not be able to accomplish a useful operation with the later instructions.

In the above example, the entry-point instruction stores a secret value in the stack pointer as a non-canonical address, HEX value "F4F4F4F4F4F4F4F4." This approach may result in a double fault if the later instructions are interrupted and the processor attempts to access this invalid stack address. Thus, if some event interrupts the subsequent program execution flow, the hypervisor will be alerted. On the other hand, if the instructions on the execute-only page are accessed correctly, starting with the entry-point instruction, and there is no attempt to interrupt the program flow, the later instructions will execute properly, in secrecy from other software.

In various implementations, encoding the keystring on an execute-only page may prevent an adversary from somehow executing the keystring to reveal it. While the adversary may be able to read the memory, various processor architectures (e.g., various x86 architectures) can allows byte granularity offsets for execution attempts. In various 64-bit x86 modes, there are a number of invalid opcodes in Intel 64. These invalid opcodes can be used to trigger an exit to the hypervisor if they are executed. For example, opcodes 60h, 61h, 62h are invalid instructions in 64-bit mode. As with the HLT instruction, a hypervisor can be configured so that execution of these opcodes will result in an exit to the hypervisor. Thus, an adversary attempting to use byte-offset execution to examine the keystring could be detected while trying to deduce the secret keystring.

In the above example, the keystring is HEX value "F4F4F4F4F4F4F4F4." Other values of the keystring are also possible. As noted above, opcodes 60h, 61h, 62h can be used in addition to the 1-byte HLT opcode (F4). In one implementation, this set of four opcodes is used as an alphabet of 2-bit symbols to construct keystrings that encode secret values. One example approach may have the number 0 (binary 00) encoded as 60 in the keystring, the number 1 (binary 01) encoded as 61 in the keystring, the number 2 (binary 10) encoded as 62 in the keystring, and the number 3 (binary 11) encoded as F4 in the keystring, FIG. 6 shows three examples entry-point instructions 620, 630, 640 that illustrate this encoding. Instruction 620 is:

mov rsp, 0x606162F4F4F4F4

In assembly language, instruction 620 may be presented as "48BCF4F4F4F4F4626160" (in raw hexadecimal machine code). This instruction loads the stack pointer with a four-byte string (606162F4) that encodes the binary number 00011011 (decimal 27), along with four padding bytes of "F4." The encoded string (606162F4) would be decoded for use by subsequent instructions that are also on the same execute-only memory page as the entry-point instruction 620.

The four padding bytes (F4F4F4F4) of "HLT" opcodes may be helpful to prevent an adversary from trying to deduce the keystring. For example, an adversary may try to execute part of the keystring 620 as a 32-bit instruction: mov esp, 0x606162F4F4F4F4F4 (raw hex=BCF4F4F4F4). This execution may, in some situations, reveal the secret part of the encoding if it were not properly padded. Similarly, it may be helpful to pad the memory in the execute-only page before the entry point instruction with F4's, to help prevent a preceding instruction sequence from revealing the secret value if executed by an adversary.

FIG. 6 also shows an example instruction 630:

mov rsp, 0xF4626160F4F4F4F4

In assembly language, instruction 630 may be presented as "48BCF4F4F4F4606162F4" (in raw hexadecimal). This instruction loads the stack pointer with a four-byte string (F4626160) that encodes the binary number 11100100 (decimal 228), along with four padding bytes of "F4."

FIG. 6 also shows an example instruction 640:

mov rsp, 0x60606060F4F4F4F4

In assembly language, instruction 640 may be presented as "48BCF4F4F4F460606060" (in raw hexadecimal). This instruction loads the stack pointer with a four-byte string (60/606,060) that encodes the binary number 00000000 (decimal 0), along with four padding bytes of "F4."

A skilled designer will appreciate that other encodings can also be made using this 4-letter alphabet (opcode 60=0; opcode 61=1; opcode 62=2; opcode F4=3). For example, consider a situation where an entry point 310 from FIG. 3 is intended to securely provide a VMFUNC view index to later instructions in protected code 326. The entry point instruction 324 can be configured to provide an eight-bit value (256 possible index values) by moving a keystring that is encoded with the four corresponding opcodes.

Further, multiple such instructions can be used to encode a large secret in parts that can be concatenated or otherwise compiled together by the intervening code between several stack pointer MOV instructions. Thus, simple encodings can be used to encode 128-bit or larger secret values. For example, a first entry point instruction would MOV a first part of the secret value to a stack pointer. Subsequent instructions could then decode the result into a separate scratchpad register (e.g., another volatile register), then execute another MOV to the stack pointer, then decode that value into the next part of the scratchpad register, and so on. This repetitive approach could build up a large secret value in a scratchpad register. In one example, the same stack pointer may be used as the volatile register. In cases where the stack pointer is used as a volatile register, the previous partial secret value of the keystring should first be copied from the stack pointer register to the scratchpad register, where it can be manipulated. The next immediate non-canonical partial secret value can then be loaded into the stack pointer, and then combined with the scratch pad value. This process can be repeated until the full secret value is constructed. Using the stack pointer and scratchpad register in this manner can assist in avoiding any part of the secret value from being disclosed to other software.

Moreover, other alphabets can also be used, either with these four opcodes (60, 61, 62, F4) or other opcodes, or even with other numbers of opcodes. For example, various processor architectures allow a hypervisor to specify what otherwise-undefined instructions or interrupts will exit to the hypervisor. Thus, additional non-executing opcodes can be specified to the CPU by the hypervisor. These opcodes may be suitable for use as letters in an encoding alphabet.

In the examples of entry-point instructions 610, 620, 630, 640, the previous contents of the stack pointer are immediately destroyed upon proper entry into a protected section of code. Thus, in these examples, it may be difficult or impossible for the protected code to branch to other code segments. This is because the branching would normally add another layer to the call stack, which is not practicable without knowledge of address of the top of the stack. That address is normally stored in the stack pointer, but is overwritten in the examples of entry-point instructions 610, 620, 630, 640. This limitation illustrates what may be a feature of the protected code. With reference back to FIG. 3, the protected code 326 is intended to be executed as a unit transaction, without disturbance. To help ensure the integrity of execution, this code may generally be structured so that it does not rely on branching to any foreign code. Thus, the initial destruction of the stack pointer's prior contents may not pose a problem. When the protected code 326 terminates, the old stack pointer value (relevant to the calling frame) is reloaded back into the stack pointer as part of the normal return process.

If protected code 326 does requires the ability to call or branch to other code, then an alternative entry-point instruction may be used. Instead of immediately overwriting the stack pointer, these other entry-point instructions may first read and record the stack pointer of the current frame, and then move a keyword into the stack pointer.

FIG. 6 also has examples of entry-point instructions that do not employ the stack pointer. Example instruction 650 reads:

mov rv1, 0x6062F461F4F4F4F4

This instruction loads a volatile register with a four-byte string (6062F461) that encodes the binary number 00101101 (decimal 45), along with four padding bytes of "F4." The volatile register (e.g., volatile register 126 in FIG. 1) is a specially designed register. As discussed above, this register is configured to erase, scramble, or otherwise protect its contents in response to events that could indicate activity by malicious or other invalid code. In this example, entry-point instruction 650 makes use of the volatile register and leaves the stack pointer undisturbed.

For example, volatile registers may be configured in hardware so that their contents are erased whenever an interrupt, memory error, protection error, or other fault occurs, or an event occurs that indicates an asynchronous change in control flow.

Example instruction 660 reads:

mov rv2, 0x3aee5514cb65f3fc

This instruction loads a volatile register rv2 with an eight-byte string (3aee5514cb65f3fc), (without the padding bytes of "F4" in the previous examples). Entry-point instruction 660 makes use of a designated volatile register (e.g., volatile register 127 in FIG. 1) and, as in the previous example, leaves the stack pointer undisturbed.

As discussed above, the use of volatile registers (such as stack pointer 124 or specialized volatile registers 126, 127) may protect a keystring from malicious access following an interrupt or asynchronous change in control flow. In various implementations, a protected instruction set may include instructions that disable interrupts and all other asynchronous events. Similarly, a protected instruction set may include instructions that disable breakpoints. After that point, an adversary program would not readily be able to interrupt the execution and attempt to expose the keystring by executing alternate code. (Alternatively, a system may be configured so that the act of loading a value into a special register can also cause the processor to disable interrupts, so that interrupts are disabled and the secret is loaded in a single atomic operation.) Thus, the protected instruction set may be configured to disable asynchronous events and then read the keystring out from the volatile register or otherwise store it in other registers or other memory. Thus, some implementations of a protected instruction set may reclaim the volatile registers for other uses, after disabling asynchronous events.

Additional examples may arise in the context of future hardware, operating systems, and software. For example, a future version of a VMFUNC may be used with a keystring that authorizes access to the instruction (e.g. if a correct key is used the instruction function will execute, otherwise a fault will be generated). Such an instruction may be a VMFUNC that has a larger index field or can hold another larger secret keystring (e.g., a 64-bit value loaded into another register), to make guessing by an adversary additionally impractical.

Moreover, the use of a functionality-enabling keystring stored in a volatile register may be helpful in a variety of other contexts. For example, various examples in the above discussion contemplate the use of page tables (e.g., extended page tables managed by a virtual machine monitor (VMM)). However, it also contemplated that some systems may be configured so that execute-only memory is declared as a range of memory addresses. If such a memory range represents addresses of physical memory, then a basic input/output system (BIOS) or early-booting firmware or software may be configured to fill a memory range with the code that uses and relies on a keystring stored in a volatile register (e.g., code 305), and configured to then set that memory range for execute-only access. In various implementations, this memory range could be defined in a set-once register so it cannot be undone by software after it is set (until a system undergoes a hardware reset or reboot). Various implementations of a system may allow pre-boot services to configure protected memory ranges in which secret keystrings may be held and to provide related privacy and/or security services.

Figure 7:
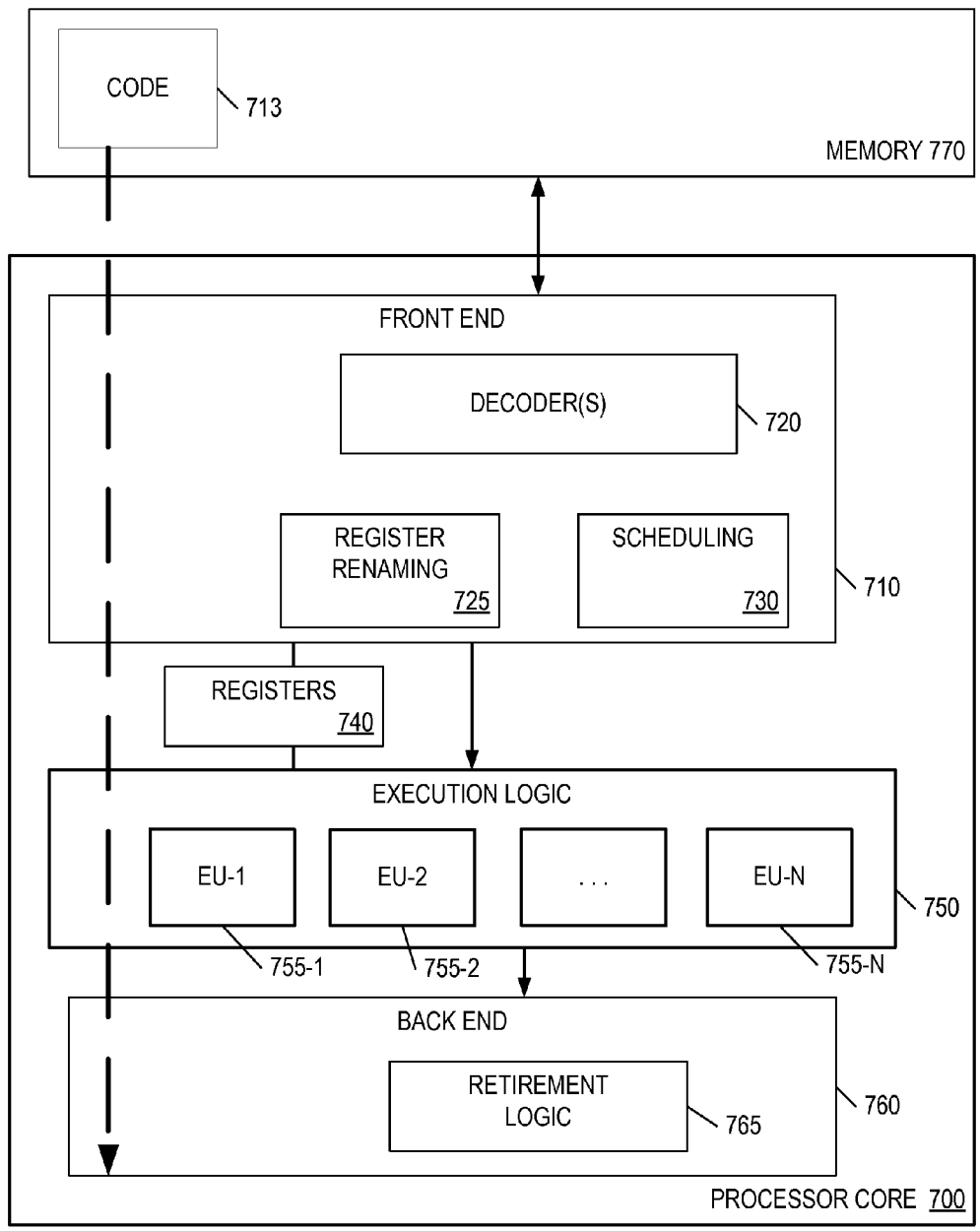
FIG. 7 illustrates one example of a processor core.

FIG. 7 illustrates one example of a processor core 700. Processor core 700 may be a core for various types of processors or processing elements, such as a micro-processor, an embedded processor, a digital signal processor (DSP), a network processor, or other circuit device for executing code. Although only one processor core 700 is illustrated in FIG. 7, a processing element may alternatively include more than one processor core. Processor core 700 may be a single-threaded core or may be multithreaded in that it may include more than one hardware thread context (or "logical processor") per core.

FIG. 7 also illustrates a memory 770 coupled to the processor core 700. Memory 770 may be any of a wide variety of types of memory circuits. Memory 770 may include one or more instruction codes 713 to be executed by processor core 700. Processor core 700 is configured to follow a program sequence of instructions indicated by code 713. Each instruction enters a front-end portion 710 of the processor core and is processed by one or more decoders 720 in the core. A decoder may generate as its output a micro operation such as a fixed width micro operation in a predefined format, or may generate other instructions, micro-instructions, or control signals, which reflect the original code instruction. Front end 710 may also include register renaming logic 725 and scheduling logic 730, which generally allocate resources and queue operations for execution.

Processor core 700 includes one or more registers 740 configured to store data within processor core 700. Registers 740 may include general registers, one or more stack pointers and other stack-elated registers, one or more instruction pointers, and/or one or more volatile registers.

Processor core 700 includes an execution logic 750 that has a set of execution units 755-1, 755-2, through 755-N. Some versions of a processor may include a number of execution units dedicated to specific functions or sets of functions. Other embodiments may include only one execution unit or one execution unit that can perform a particular function. Execution logic 750 performs the operations that are specified by code instructions. After completion of execution of the operations specified by the code instructions, a back end logic 760 in the processor core retires the instructions of the code 713. In one embodiment, the processor core 700 allows out-of-order execution but requires in-order retirement of instructions. A retirement logic 765 in back end logic 760 may take a variety of forms as known to those of skill in the art (e.g., re-order buffers or the like). In this manner, processor core 700 is transformed during execution of the code 713, at least in terms of the output generated by the decoder, tables utilized by the register renaming logic 725, and any registers 740 modified by the operation of execution logic 750.

Although not illustrated in FIG. 7, a processing element may include other elements on chip with processor core 700. For example, a processing element may include memory control along with the processor core. The processing element may include I/O control logic and/or may include I/O control logic integrated with memory control logic. The processing element may also include one or more caches.

Figure 8:
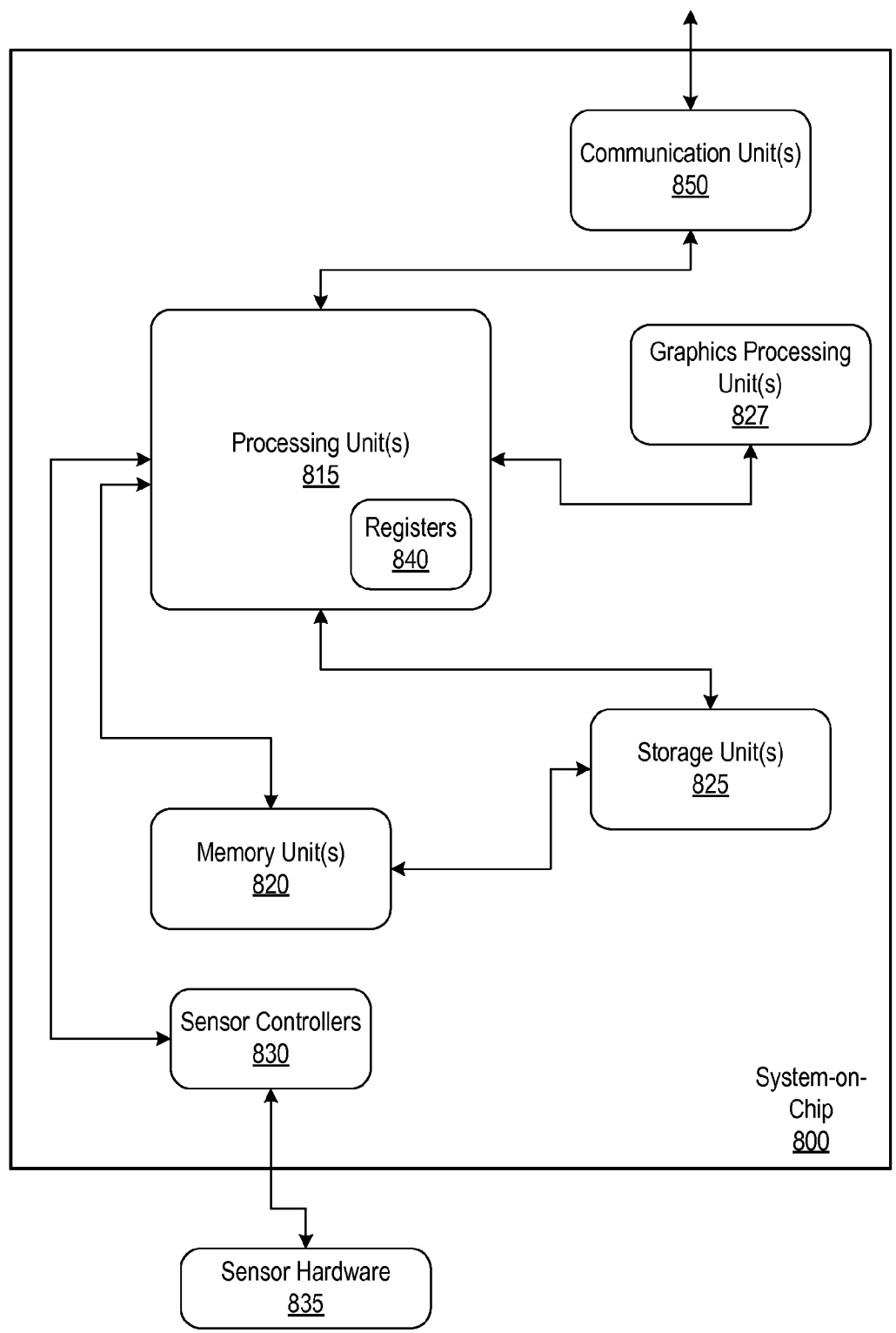
FIG. 8 is a block diagram of one example of a system-on-chip.

FIG. 8 is a block diagram of one example of a system-on-chip 800. System-on-chip 800 may be designed, in various implementations, as a single integrated circuit package. In some implementations, system-on-chip 800 may be fabricated on a single semiconductor wafer substrate. In various examples, system-on-chip 800 may be constructed using various SOC designs and manufacturing methods to create effectively a small computing system. Among other units, system-on-chip 800 may include processing units 815, memory units 820, storage units 825, graphics processing units 827, communication units 850, and sensor controller units 830. It should be noted that in other implementations, one or more of the various devices and modules in system-on-chip 800 may be fabricated on separate semiconductor wafer substrates.

Additionally, system-on-chip 800 may be coupled via sensor controller unit 830 to sensor hardware 835 such as cameras, microphones, antennas, speakers, touchscreens, keyboards, mice, location sensors, proximity sensors, light sensors, accelerometers, magnetic sensors, pressure sensors, temperature sensors, biometric security sensors, etc.

In some embodiments, instructions/software code may be stored in a combination of non-volatile/volatile memory such as storage units 825 and memory units 820. The instructions may be configured to be processed by processing unit 815 in order to facilitate at least some of the functionality of system-on-chip 800. Processing unit 815 includes registers 840, which may be configured to store data for quick accessibility by the processing unit. Registers 840 may include one or more volatile registers.

In some embodiments, system-on-chip 800 may be a portable device, such as a mobile phone, a smartphone with a touchscreen, a tablet, a laptop, a hybrid device, another communication device, etc.

Additional Notes and Examples. Some further illustrative examples of implementations of methods, devices, and systems are noted below.

Example 1 is a method of storing computer instructions for execution. The method includes regulating a memory region for execute-only access, storing a set of instructions in the memory region, and executing an early instruction among the set of instructions. The executing the early instruction includes loading a secret value into a volatile register and executing a set of subsequent instructions. A correct execution of the subsequent instructions depends on the secret value being loaded into the volatile register.

Example 2 may include the method of example 1, with the set of executable instructions forming a transactional set of instructions that are configured to use the secret value to thwart improper execution (e.g., partial execution or out-of-order execution). In various implementations, the instructions are configured so that they cannot successfully be executed unless a keystring or other secret value has been loaded into a register.

Example 3 may include the method of any one of examples 1 to 2, with the volatile register including a stack pointer.

Example 4 may include the method of any one of examples 1 to 3, with the secret value including a non-canonical address.

Example 5 may include the method of any one of examples 1 to 4, with the subsequent instructions configured to perform an indirect jump to an address based on the secret value.

Example 6 may include the method of any one of examples 1 to 5, wherein the subsequent instructions are configured not to disturb a stack pointer during a time period that is after the loading the secret value and prior to the indirect jump.

Example 7 may include the method of any one of examples 1 to 6, and preserving the secret value in a stack pointer until the secret value is no longer needed for the correct execution of the subsequent instructions.

Example 8 may include the method of any one of examples 1 to 7, with the subsequent instructions being configured to disable interrupts, and/or indirect jumps, and/or call/return instructions.

Example 9 may include the method of any one of examples 1 to 8, with the regulating the memory region including restricting the memory region to execution under: a Ring 0 access privilege, a CPL0 protection level, or other supervisory mode.

Example 10 may include the method of any one of examples 1 to 9, with the loading the secret value into the volatile register including loading an immediate value into the volatile register.

Example 11 may include the method of any one of examples 1 to 10, with the executing the set of subsequent instructions including converting the secret value to a valid address.

Example 12 may include the method of any one of examples 1 to 11, with the executing the set of subsequent instructions including erasing the secret value from the stack pointer.

Example 13 may include the method of any one of examples 1 to 12 with the secret value including an address.

Example 14 may include the method of any one of examples 1 to 13, with the executing the set of subsequent instructions including decoding an address from the secret value loaded in the volatile register.

Example 15 may include the method of any one of examples 1 to 14, with the executing the set of subsequent instructions including performing a jump to an address.

Example 16 may include the method of any one of examples 1 to 15, with the executing the set of subsequent instructions including performing or more load/store operations to an address.

Example 17 may include the method of any one of examples 1 to 16, with the executing the set of subsequent instructions including one or more MOV instructions with an address as an operand.

Example 18 may include the method of any one of examples 1 to 17, with the secret value stored in the volatile register including a memory-view index, and with the processor being configured to switch to a memory view, based at least on the memory-view index, in response to execution of a VMFUNC instruction.

Example 19 may include the method of any one of examples 1 to 18, with the secret value stored in the volatile register including a key, and with the processor being configured to perform a cryptographic function based at least on the key.

Example 20 may include the method of any one of example 19, with the cryptographic function including one or more of: encrypting contents of a portion of memory, decrypting contents of a portion of memory, or authenticating contents of a portion of memory.

Example 21 may include the method of any one of examples 1 to 20, with the regulating the memory region including setting, by a processor, an access permission for an Extended Page Table to be one of: an execute-only permission or a supervisor execute-only permission.

Example 22 may include the method of any one of examples 1 to 21, with the regulating the memory region including setting, by a processor, an access permission for an Extended Page Table to forbid a read access and to forbid a write access.

Example 23 may include the method of any one of examples 1 to 22, with the regulating the memory region including preventing an operating system from reading the memory region, within the preventing being performed by a processor that executes the operating system.

Example 24 may include the method of any one of examples 1 to 23, with the memory region including memory for which a set of contiguous virtual memory addresses are mapped to a set of discontiguous machine memory addresses, or a set of potentially discontiguous machine memory addresses.

Example 25 may include the method of any one of examples 1 to 24, and maintaining a mapping from the virtual memory addresses to the machine memory addresses.

Example 26 may include the method of any one of examples 1 to 26, with the hypervisor executing with Ring 0 access privilege. An operating system is supported by the hypervisor and calls the set of instructions. The operating system executes with an access protection that is more restricted than Ring 0.

Example 27 may include the method of any one of examples 1 to 26, with the regulating the memory region being performed by the hypervisor. The set of instructions is among instructions in software supported by the hypervisor.

Example 28 may include the method of any one of examples 1 to 27 with the secret value indicating a wormhole address.

Example 29 may include the method of any one of examples 1 to 28, with the set of instructions being configured not to store information about the secret value in memory that is accessible to low-security software.

Example 30 may include the method of any one of examples 1 to 29, with the set of instructions being configured not to store information about the secret value in memory that is readable by adversarial code configured to execute a code-reuse attack.

Example 31 may include the method of any one of examples 1 to 30, with the adversarial code being configured to execute one or more of: a return-oriented programming attack, or a jump-oriented programming attack.

Example 32 includes a system for storing computer instructions. The system includes a memory and a processor that includes one or more volatile registers. The processor is configured to regulate access to portions of the memory, and to execute a first set of instructions stored in a first portion of the memory. The first set of instructions is configured to cause the processor to load a secret value into one or more of the volatile registers. The processor is configured to lose, in response to an asynchronous event, information loaded in the volatile registers.

Example 33 may include the system of example 32, with the first portion of the memory being regulated with execute-only access.

Example 34 may include the system of any one of examples 32 to 33, and a storage medium that includes instructions executable by the processor. The instructions are executable by the processor to store the first set of instructions in the first portion of the memory and to regulate the first portion of the memory as execute-only memory.

Example 35 may include the system of any one of examples 32 to 34, with one or more early instructions among the first set of instructions being configured to direct the processor to load the secret value into the volatile register. One or more subsequent instructions among the first set of instructions depend on the secret value for correct execution.

The foregoing description presents one or more embodiments of various systems and methods. It should be noted that these and any other embodiments are exemplary and are intended to be illustrative of the invention rather than limiting. While the invention is widely applicable to various types of technologies and techniques, a skilled person will recognize that it is impossible to include all of the possible embodiments and contexts of the invention in this disclosure.

Furthermore, those skilled in the art will recognize that boundaries between the functionality of the above described operations are merely illustrative. The functionality of several operations may be combined into a single operation, and/or the functionality of a single operation may be distributed in additional operations. Moreover, alternative embodiments may include multiple instances of a particular operation, and the order of operations may be altered in various other embodiments. Those of skill will appreciate that some of the illustrative logical blocks, modules, circuits, acts, and steps described in connection with the embodiments disclosed herein may be implemented as hardware, firmware, software, or combinations of those. To illustrate this interchangeability of hardware, firmware, and software, some illustrative components, blocks, modules, circuits, acts, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the spirit or scope of the present invention.

Some benefits and advantages that may be provided by some embodiments have been described above. These benefits or advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations that follow those terms. While the foregoing description refers to particular embodiments, it should be understood that the embodiments are illustrative and that the scope of the invention is not limited to these embodiments. Many variations, modifications, additions and improvements to the embodiments described above are possible.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, application programs, operating system software, firmware, subroutines, application program interfaces (API), or others, or any combination thereof.

Some systems or supporting systems may be implemented, for example, using a machine or tangible computer-readable medium or article which may store an instruction or a set of instructions that, if executed by a machine, may cause the machine to perform a method and/or operations in accordance with the embodiments. Instructions may be stored on machine-readable medium such as a magnetic medium (e.g., hard disk, floppy disk, tape), a semiconductor medium (e.g., flash memory, RAM), an optical medium (e.g., CD, DVD), or others, or combinations thereof. One or more aspects of a system may include representative instructions stored on a machine-readable medium that represents various logic within a processor, which when read by a machine causes the machine to fabricate logic to perform the techniques described herein.

Various actions described herein involve operations performed by electronic computing devices that manipulate and/or transform data represented as physical quantities (e.g., electronic) within the computing system's registers and/or memories into other data similarly represented as physical quantities within the computing system's memories, registers or other such information storage, transmission, or display devices.

What is claimed is:

1. A method of storing computer instructions for execution, the method comprising:
regulating a memory region for execute-only access;
storing a set of instructions in the memory region;

executing an early instruction among the set of instructions, wherein the executing the early instruction comprises loading a secret value into a volatile register, the volatile register configured in hardware to protect its contents in response to events that indicate activity by malicious or invalid code; and executing a set of subsequent instructions among the set of instructions, wherein a correct execution of the subsequent instructions depends on the secret value being loaded into the volatile register.

2. The method of claim 1, wherein the set of instructions comprises a transactional set of instructions that are configured to thwart one or more of:
out-of-order execution of the set of instructions; or
partial execution of the set of instructions.

3. The method of claim 1, wherein the secret value comprises a non-canonical address and wherein the volatile register comprises a stack pointer.

4. The method of claim 3, wherein the subsequent instructions are configured to cause the processor to perform an indirect jump to an address based on the secret value in the stack pointer.

5. The method of claim 4, wherein the subsequent instructions are configured not to disturb the stack pointer during a time period that is after the loading the secret value and prior to the indirect jump.

6. The method of claim 3, comprising:
preserving the secret value in the stack pointer until the secret value is no longer needed for the correct execution of the subsequent instructions.

7. The method of claim 1, wherein the set of instructions is configured to cause the processor to disable one or more of:
interrupts; or
breakpoints.

8. The method of claim 1, wherein the regulating the memory region comprises:
restricting the memory region to execution under: a Ring 0 access privilege, a CPL0 protection level, or other supervisory mode.

9. The method of claim 1, wherein the loading the secret value into the volatile register comprises:
loading an immediate value into the volatile register.

10. The method of claim 1, wherein the executing the set of subsequent instructions comprises:
erasing the secret value from the volatile register.

11. The method of claim 1, wherein:
the executing the set of subsequent instructions comprises decoding an address from the secret value loaded in the volatile register.

12. The method of claim 1, wherein:
the executing the set of subsequent instructions comprises performing a jump to an address based at least on the secret value loaded in the volatile register.

13. The method of claim 1, wherein:
the executing the set of subsequent instructions comprises at least one MOV instruction with an address based at least on the secret value loaded in the volatile register.

14. The method of claim 1, wherein:
the secret value stored in the volatile register comprises a memory-view index; and
the processor is configured to switch to a memory view, based at least on the memory-view index, in response to execution of a VMFUNC instruction.

15. The method of claim 1, wherein:
the secret value stored in the volatile register comprises a key; and
the processor is configured to perform a cryptographic function based at least on the key.

16. The method of claim 1, wherein the regulating the memory region comprises setting, by a processor, an access permission for an Extended Page Table to be one of:
an execute only permission, or
a supervisor execute only permission.

17. The method of claim 1, wherein the regulating the memory region comprises preventing an operating system from reading the memory region, wherein the preventing is performed by a processor that executes the operating system.

18. The method of claim 1, comprising:
maintaining a mapping from a virtual memory addresses to a machine memory addresses, wherein
the maintaining the mapping is performed by a hypervisor,
the hypervisor executes in a vmx-root ring-0 access privilege,
an operating system calls the set of instructions, and
the operating system is supported by the hypervisor and executes with an access protection that is more restricted than Ring 0.

19. The method of claim 18, wherein:
the regulating the memory region is performed by the hypervisor; and
the set of instructions is among instructions in software that is supported by the hypervisor.

20. The method of claim 1, wherein the secret value indicates a wormhole address.

21. The method of claim 1, wherein the set of instructions is configured to cause the processor to store information about the secret value only in memory that is protected from adversarial code.

22. A system for storing computer instructions, the system comprising:
a memory; and
a processor comprising at least one volatile register, the volatile register configured in hardware to protect its contents in response to events that indicate activity by malicious or invalid code, wherein
the processor is configured to regulate access to portions of the memory,
the processor is configured to execute a first set of instructions stored in a first portion of the memory,
the first set of instructions is configured to cause the processor to load a secret value into the volatile register, and
the processor is configured to lose, in response to an asynchronous event, information loaded in the volatile register.

23. The system of claim 22, wherein the first portion of the memory is regulated with execute-only access.

24. The system of claim 22, wherein:
one or more early instructions among the first set of instructions is configured to cause the processor to load the secret value into the volatile register; and
one or more subsequent instructions among the first set of instructions depend on the secret value for correct execution.

25. The system of claim 22, wherein the secret value comprises a non-canonical address and wherein the volatile register comprises a stack pointer.

26. The system of claim 22, wherein:
the secret value comprises a memory-view index; and
the first set of instructions comprises a VMFUNC instruction configured to cause the processor to switch to a memory view based at least on the memory-view index loaded in the volatile register.

27. The system of claim 22, wherein the secret value indicates a wormhole address.

28. At least one non-transitory, machine-accessible storage medium having instructions stored thereon, wherein the instructions are configured, when executed on a machine, to cause the machine to:
- regulate a memory region for execute-only access;
- store a set of instructions in the memory region;
- execute an early instruction among the set of instructions, wherein the early instruction is configured to cause the machine to load a secret value into a volatile register, the volatile register configured in hardware to protect its contents in response to events that indicate activity by malicious or invalid code; and
- execute a set of subsequent instructions among the set of instructions, wherein a correct execution of the subsequent instructions depends on the secret value being loaded into the volatile register.

29. The storage medium of claim 28, wherein:
- the processor is configured to lose, in response to an asynchronous event, information loaded in the volatile register; and
- the set of instructions comprises a transactional set of instructions that are configured to thwart one or more of:
  - out-of-order execution of the set of instructions, or
  - partial execution of the set of instructions.

30. The storage medium of claim 28, wherein the secret value comprises a non-canonical address and wherein the volatile register comprises a stack pointer.

* * * * *